Nov. 5, 1935.  G. M. BARNES  2,019,482
VEHICLE
Filed Feb. 28, 1934
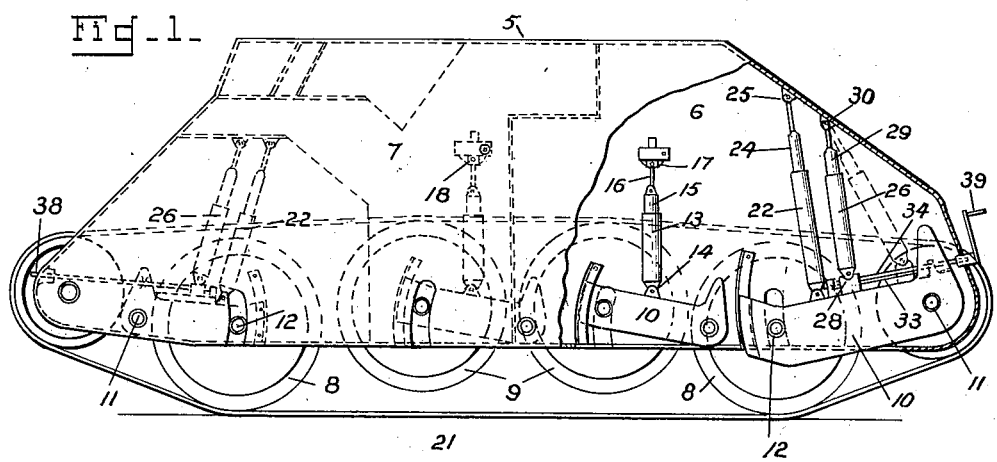
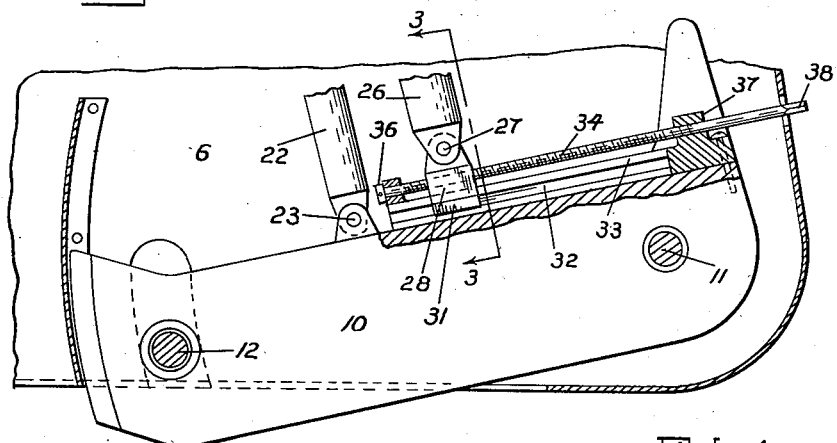
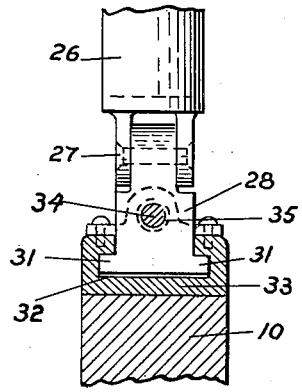
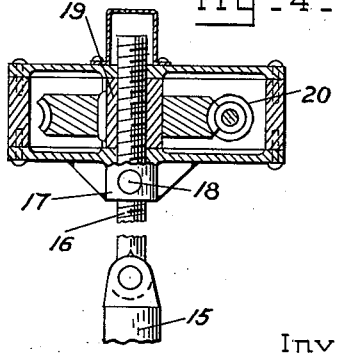
Inventor
Gladeon M. Barnes
By W. N. Roach
Attorney Patented Nov. 5, 1935

2,019,482

UNITED STATES PATENT OFFICE 2,019,482

VEHICLE

Gladeon M. Barnes, U. S. Army, Hastings, Mich.

Application February 28, 1934, Serial No. 713,355

5 Claims. (Cl. 180—9.1)

(Granted under the act of March 3, 1883, as amended April 30, 1928; 370 O. G. 757)

The invention described herein may be manufactured and used by or for the Government for governmental purposes, without the payment to me of any royalty thereoon.

This invention relates to a vehicle.

In heavy vehicles of the track-laying type it has been customary to place each of the wheels on one end of a lever which is fulcrumed on the body of the vehicle and acts against a resilient suspension mechanism. In traveling on good roads the track is removed and the intermediate levers are rotated so that their wheels are clear of the ground. The load which was carried by the intermediate wheels is now transferred to the end wheels.

The purpose of this invention is to provide a vehicle of the convertible road and track-laying type in which the loading capacity of the resilient suspension units for the levers of the end wheels may be conveniently varied over a wide range. When all of the wheels are employed, the load of the vehicle is distributed so that the end wheels carry less load than the intermediate wheels whereby steering is greatly facilitated. When the intermediate wheels are inoperated the suspension mechanism of the end wheels is adjusted to increase its loading capacity.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a view in side elevation and partly in section of a vehicle constructed in accordance with the invention.

Fig. 2 is an enlarged view in side elevation partly in section of an end suspension unit.

Fig. 3 is a detail sectional view of the adjusting mechanism of one of the intermediate suspension units.

Fig. 4 is a detail sectional view of the adjusting mechanism of an intermediate wheel.

Referring to the drawing by characters of reference, there is shown a vehicle including a body 5 having on each side an inner hull 6 and an outer hull 7 spaced therefrom. The vehicle is designed to run on end wheels 8—8 and intermediately placed wheels 9—9, each carried on the end of a lever 10 disposed between the hulls and trunnioned therein as at 11. The levers are additionally supported by a shaft or pin 12 carried by the body.

The suspension between the body and the levers of the intermediate wheels forms the subject of a copending application Serial No. 713,357 filed February 28, 1934 and will be but briefly described. It comprises a cylinder 13 pivotally attached by a pin 14 to the lever, and a piston 15 working in the cylinder against a yielding supporting element such as air or oil under pressure or a spring as shown in the copending application or in Patent No. 1,824,086 of September 22, 1931. The piston is formed with an outer threaded portion 16 slidably mounted in a block 17 trunnioned as at 18 in the hulls 6 and 7. A nut 19 on the threaded portion 16 of the piston is driven by worm gearing 20. The purpose of this actuating mechanism is to rotate the lever and raise the wheel off the ground.

In traveling on good roads it is customary to remove the self-laying track 21, inoperate the intermediate wheels 9 by raising them and employ only the end wheels 8.

The levers of the end wheels 8 are each provided with two suspension units preferably of different sizes and capacities. One unit includes a cylinder 22 attached by a pivot pin 23 to the lever and a piston 24 attached by a pivot pin 25 to the body and working in the cylinder against a yielding supporting element.

The other suspension unit is of similar type and is positioned between the unit 22—24 and the pivot 11 of the lever. It includes a cylinder 26 attached by a pivot pin 27 to a sliding block 28 and a piston 29 attached by a pivot pin 30 to the body.

The block 28 is provided on opposite sides with tongues 31 riding in grooves 32 formed in a rail 33 fixed to the lever. The block is reciprocated by means of a screw shaft 34 which passes through a threaded aperture 35 in the block and has its inner end 36 anchored in the end of the rail. The screw shaft may be additionally supported in a bearing 37 fixed to the lever. The outer end 38 of the screw shaft is squared and detachably receives a crank handle 39. When the suspension unit 26—29 is in the position shown in dotted lines in Fig. 1, with its connection to the lever approximately over the fulcrum of the lever, it will be ineffective in supporting the load of the vehicle.

When this suspension unit has been moved to the position shown in full lines in Fig. 1 where it is substantially vertical and parallel to the unit 22—24, it will have an effective lever arm and its maximum load-supporting capacity. The load capacity of the end levers 26—29 can thus be increased or decreased at will over a considerable range to supplement the end levers 13—15.

As an example, when all of the wheels and the track are being employed, the load on the end wheels is preferably 1520 pounds, and the load on the intermediate wheels is 1850 pounds. This distribution of the load greatly facilitates steering of the vehicle.

When the track is removed, the suspension units 26—29 are brought into play to substitute for the intermediate units 13—15 that the intermediate wheels may be inoperated without resulting in lowering the body of the vehicle, the load which was carried by the intermediate units being transferred to the units 26—29. The two suspension units of an end wheel have the capacity to support one-fourth of the load.

While two suspension units have been shown for each end wheel it is obvious that, where space permits, one adjustable unit may be employed having a maximum loading capacity, when fully effective, to support one-fourth of the load.

I claim:

1. In a vehicle, a body, a series of levers fulcrumed on the body, a wheel on each lever, a suspension unit between the body and each intermediate lever of the series, means including the suspension unit for moving and holding each of said intermediate levers in inoperative position, a suspension unit pivotally attached to the body and each of the end levers of the series, a block slidably mounted on each end lever for movement in the direction of the length of said lever, means for moving said block and a suspension unit pivotally attached to the body and to said block.

2. In a vehicle, a body, a series of wheels for said body, a resilient suspension unit between the body and each intermediate wheel, means including the suspension units for moving and holding said intermediate wheels in inoperative position, a lever fulcrumed at each of the ends of the body and carrying an end wheel, a resilient suspension unit between the body and each end lever, said last named unit having less loading capacity than the suspension units of the intermediate wheels, and an auxiliary resilient suspension unit between the body and each end lever and including a movable connection with said lever whereby the effective lever arm of said unit may be varied.

3. In a vehicle, a body, a series of wheels for said body, a resilient suspension unit between the body and each intermediate wheel, means including the suspension units for moving and holding said intermediate wheels in inoperative position, a lever fulcrumed at each of the ends of the body and carrying an end wheel, a resilient suspension unit between the body and each end lever and including a movable connection with said lever, and means for moving said connection along the lever whereby the effective lever arm of said unit may be varied.

4. In a vehicle, a body, a lever fulcrumed on the body, a wheel on the lever, a block slidably mounted on the lever for movement towards and away from the fulcrum of the lever, means for moving said block and a suspension unit pivotally attached to the body and to said block.

5. In a vehicle, a body, a lever fulcrumed on the body, a wheel on the lever and a resilient suspension unit between the body and lever and including a movable connection with said lever, and means for moving said connection along the lever whereby the effective lever arm of said unit may be varied.

GLADEON M. BARNES.